US006696189B2

(12) United States Patent
Bostaph et al.

(10) Patent No.: US 6,696,189 B2
(45) Date of Patent: *Feb. 24, 2004

(54) DIRECT METHANOL FUEL CELL SYSTEM INCLUDING AN INTEGRATED METHANOL SENSOR AND METHOD OF FABRICATION

(75) Inventors: Joseph W. Bostaph, Chandler, AZ (US); Chowdary R. Koripella, Scottsdale, AZ (US); Allison M. Fisher, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 194 days.

This patent is subject to a terminal disclaimer.

(21) Appl. No.: 09/738,130

(22) Filed: Dec. 15, 2000

(65) Prior Publication Data

US 2002/0076589 A1 Jun. 20, 2002

(51) Int. Cl.[7] ............ H01M 8/02; H01M 8/04; H01M 8/10; H01M 4/86
(52) U.S. Cl. ............ 429/22; 429/32; 429/34; 429/38; 429/42; 429/44; 427/115
(58) Field of Search ............ 429/22, 30, 32, 429/34, 38, 39, 42, 44; 29/623.1; 427/115

(56) References Cited

U.S. PATENT DOCUMENTS

| 5,897,766 | A | * | 4/1999 | Kawatsu ............ 204/409 |
| 6,146,781 | A | | 11/2000 | Surampudi et al. |
| 6,287,717 | B1 | * | 9/2001 | Cavalca et al. ............ 429/40 |
| 6,387,559 | B1 | * | 5/2002 | Koripella et al. ............ 429/22 |
| 6,465,119 | B1 | * | 10/2002 | Koripella et al. ............ 326/105 |
| 6,497,975 | B2 | * | 12/2002 | Bostaph et al. ............ 429/38 |
| 2003/0031908 | A1 | * | 2/2003 | Bostaph et al. ............ 429/30 |
| 2003/0031913 | A1 | * | 2/2003 | Pavio et al. ............ 429/34 |

FOREIGN PATENT DOCUMENTS

| DE | 19921816 C1 | 10/2000 |
| WO | WO 98/45694 | 10/1998 |
| WO | WO 01/54217 A2 | 7/2001 |
| WO | WO 02/09218 A2 | 1/2002 |
| WO | WO 02/49136 A2 | 6/2002 |

OTHER PUBLICATIONS

Barton et al., "A Methanol Sensor for Portable Direct Methanol Fuel Cells," J. Electrochem Soc. 145 (11), pp. 3783–3788, Nov. 1998.*
Kelley et al., "A miniature methanol/air polymer electrolyte fuel cell," Electromechanical and Solid–State Letters, 3, (2000), pp. 407–409.
Morse et al., "A novel thin film solid oxide fuel cell for microscale energy conversion," SPIE conference on micromachined devices and components, Sep. 1999, pp. 223–226.

* cited by examiner

Primary Examiner—Randy Gulakowsi
Assistant Examiner—Jonathan Crepean
(74) Attorney, Agent, or Firm—William E. Koch

(57) ABSTRACT

A fuel cell system and method of forming the fuel cell system including a base portion, formed of a singular body, and having a major surface. At least one fuel cell membrane electrode assembly is formed on the major surface of the base portion. A fluid supply channel including a mixing chamber is defined in the base portion and communicating with the fuel cell membrane electrode assembly for supplying a fuel-bearing fluid to the membrane electrode assembly. A methanol concentration sensor is positioned to communicate with the fuel cell membrane electrode assembly and the fuel-supply channel for regulating the mixture of fuel to the electrode assembly. An exhaust channel including a water recovery and recirculation system is defined in the base portion and communicating with the membrane electrode assembly.

18 Claims, 3 Drawing Sheets

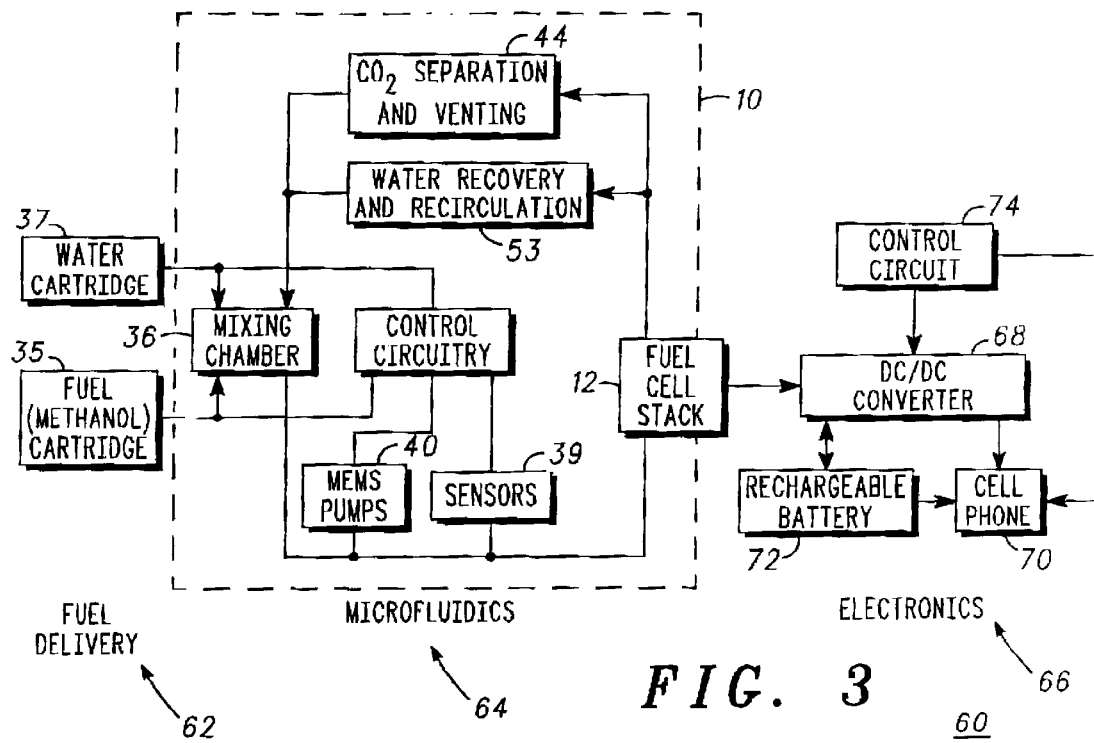
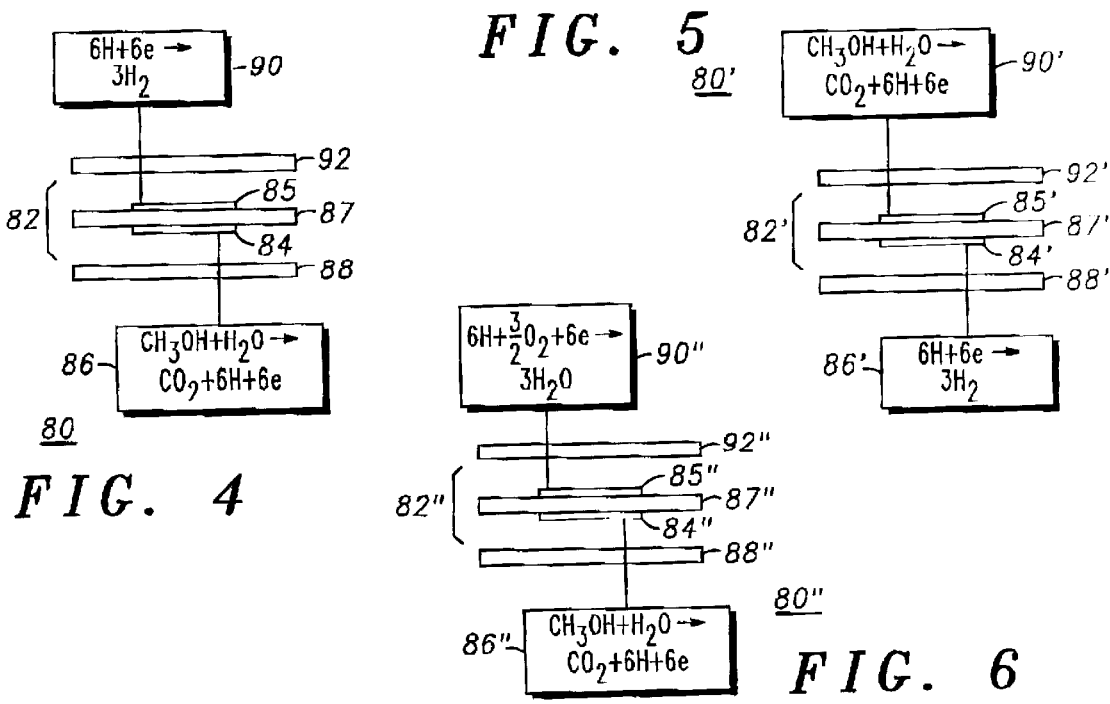

DIRECT METHANOL FUEL CELL SYSTEM INCLUDING AN INTEGRATED METHANOL SENSOR AND METHOD OF FABRICATION

FIELD OF INVENTION

The present invention pertains to fuel cells, and more particularly to a direct methanol fuel cell system including an integrated methanol concentration sensor and a method of fabricating the system, in which electrical energy is produced through the consumption of gaseous or liquid fuels.

BACKGROUND OF THE INVENTION

Fuel cells in general, are "battery replacements", and like batteries, produce electricity through an electrochemical process without combustion. The electrochemical process utilized provides for the combining of hydrogen protons with oxygen from air or as a pure gas. The process is accomplished utilizing a proton exchange membrane (PEM) sandwiched between two electrodes, namely an anode and a cathode. Fuel cells, as known, are a perpetual provider of electricity. Hydrogen is typically used as the fuel for producing the electricity and can be processed from methanol, natural gas, petroleum, or stored as pure hydrogen. Direct methanol fuel cells (DMFCs) utilize methanol, in a gaseous or liquid form as fuel, thus eliminating the need for expensive reforming operations. DMFCs provide for a simpler PEM cell system, lower weight, streamlined production, and thus lower costs.

In a standard DMFC, a dilute aqueous solution of methanol is fed as the fuel on the anode side (first electrode) and the cathode side (second electrode) is exposed to forced or ambient air (or $O_2$). A Nafion® type proton conducting membrane typically separates the anode and the cathode sides. Several of these fuel cells can be connected in series or parallel depending on power requirements.

Typically, DMFC designs are large stacks with forced airflow operating at elevated temperatures of approximately 60–80° C. Smaller air breathing DMFC designs require the miniaturization of all the system components and thus more complicated. In conventional PEM fuel cells, stack connections are made between the fuel cell assemblies with conductive plates, machined with channels or grooves for gas distribution. A typical conventional fuel cell is comprised of an anode ($H_2$ or methanol side) current collector, anode backing, membrane electrode assembly (MEA) (anode electrocatalyst/ion conducting membrane/cathode electrocatalyst), cathode backing, and cathode current collector. Typical open circuit voltage under load for a direct methanol fuel cell is approximately in the range of 0.3–0.5 V. To obtain higher voltages, fuel cells are typically stacked in series (bi-polar manner—positive to negative) one on top of another, or connecting different cells in series in a planar arrangement. Conventional fuel cells can also be stacked in parallel (positive to positive) to obtain higher current, but generally, larger fuel cells are simply used instead.

During operation of a direct methanol fuel cell, a dilute aqueous methanol (usually 3–4 vol % methanol) solution is used as the fuel on the anode side. Current DMFC designs are for larger stacks with forced airflow. The smaller air breathing DMFC designs are difficult to accomplish because of the complexity in miniaturizing all the required system components and integrating them in a small unit required for portable applications. Carrying the fuel in the form of a very dilute methanol mixture would require carrying a large quantity of fuel which is not practical for the design of a miniature power source for portable applications. Miniaturizing the DMFC system requires carrying methanol and water separately and mixing them in-situ for the fuel cell reaction to take place. If the methanol concentration is too high, then there is a methanol crossover problem that will reduce the efficiency of the fuel cell. If the methanol concentration is too low then there will not be enough fuel on the anode side for the fuel cell reaction.

Accordingly, the integration of a chemical sensor, such as a methanol sensor, into the DMFC system to monitor the concentration of the fuel consisting of a mixture of methanol in deionized water, would prove beneficial. A chemical sensor can be defined as a measurement device that utilizes chemical reactions to detect and quantify a specific analyte or event. In a DMFC system, the analyte is methanol in deionized water. There are a variety of chemical sensors that have been developed such as electrochemical, photometric, calorimetric, acoustical or mechanical. Of these, electrochemical sensors operating on the potentiometric or amperometric principle would prove beneficial if integrated into a DMFC system for the purpose of monitoring the concentration of the fuel.

Accordingly, it is a purpose of the present invention to provide for a direct methanol fuel cell system design that has included an integrated sensor for the monitoring of the fuel supply.

It is a purpose of the present invention to provide for a direct methanol fuel cell system and integrated sensor that includes microchannels and cavities and microfluidics technology for fuel-bearing fluid mixing, pumping and recirculation.

It is still a further purpose of the present invention to provide for a direct methanol fuel cell system and integrated sensor in which all of the system components are embedded inside a base portion, such as a ceramic base portion.

It is yet a further purpose of the present invention to provide for method of fabricating a direct methanol fuel cell system and integrated sensor which includes the steps of providing for microchannels and cavities in which microfluidic technology is a basis for the mixing, pumping and recirculation of a fuel-bearing fluid.

SUMMARY OF THE INVENTION

The above problems and others are at least partially solved and the above purposes and others are realized in a fuel cell system and method of forming the fuel cell system including a base portion, formed of a singular body, and having a major surface. At least one membrane electrode assembly is formed on the major surface of the base portion. A fluid supply channel is defined in the base portion and communicates with the at least one membrane electrode assembly for supplying a fuel-bearing fluid to the at least one membrane electrode assembly. An integrated methanol concentration sensor is provided in fluidic communication with the fluid supply channel and the membrane electrode assembly for regulating the fuel supply to the membrane electrode assembly. An exhaust channel is defined in the base portion and communicating with the at least one membrane electrode assembly. The exhaust channel is spaced apart from the fluid supply channel for exhausting fluid from the at least one membrane electrode assembly. The membrane electrode assembly and the cooperating fluid supply channel and cooperating exhaust channel forming a single fuel cell assembly.

BRIEF DESCRIPTION OF THE DRAWINGS

The foregoing and further and more specific objects and advantages of the instant invention will become readily apparent to those skilled in the art from the following detailed description of the preferred embodiments thereof taken in conjunction with the drawings, in which:

FIG. 3 is a simplified schematic diagram illustrating the system of the present invention; and FIGS. 4–6 are simplified partial sectional views of methanol sensors for integration into the fuel cell system of the present invention.

DESCRIPTION OF THE PREFERRED EMBODIMENTS

Figure 1:
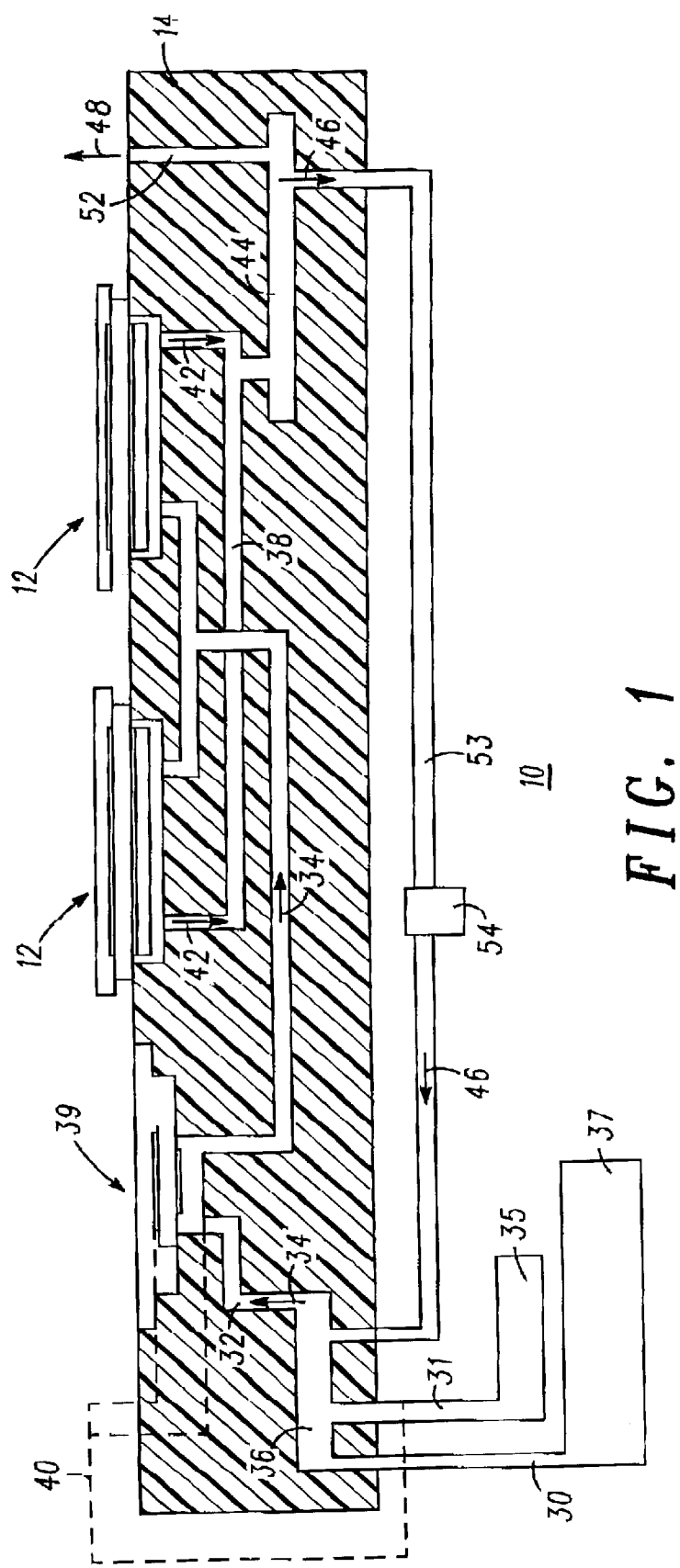
FIG. 1 is a simplified sectional view of a direct methanol fuel cell system including an integrated sensor formed on a single base portion including a plurality of microfluidic channels, according to the present invention.

Turning now to the drawings, FIG. 1 illustrates in simplified sectional view a direct methanol fuel cell system fabricated according to the present invention. More particularly, there is formed a planar stack array 10, including two direct methanol fuel cells, generally referenced 12. Fuel cells 12 are formed on a base portion 14, each fuel cell 12 being spaced at least 1 mm apart from an adjacent fuel cell 12. It should be understood that dependent upon the required power output, any number of fuel cells 12 can be fabricated to form a planar array of fuel cells, from one single fuel cell, to numerous fuel cells. The material of base portion 14 is designed to be impermeable to the fuel and oxidizer materials that is utilized to power fuel cells 12. Typically a hydrogen-containing fuel is utilized to power fuel cells 12. Suitable fuels that are consumed by fuel cells 12 to produce electrical energy are hydrogen-containing materials such as hydrogen, methane and methanol. In this particular example, an aqueous solution of methanol is used to fuel cells 12. Base portion 14 is typically formed of glass, plastic, silicon, graphite, ceramic, or any other suitable material. In this particular embodiment, planar stack array 10 is composed of the at least two direct methanol fuel cells 12 each defined by a fuel cell membrane electrode assembly (MEA) (discussed presently FIG. 2), accordingly, planar stack array 10 includes two fuel cell membrane electrode assemblies.

Base portion 14 has formed within a plurality of microfluidic channels as illustrated. More particularly, base portion 14 has formed a first fluid inlet 30 and a second fluid inlet 31, in fluidic communication with a fluid supply channel 32. Fluid supply channel 32 is formed in base portion 14 utilizing standard techniques, well known in the art, such as multi-layer ceramic technology, micromachining, or injection molding. Fluid supply channel 32 supplies a fuel-bearing fluid 34 to each of the at least two spaced apart fuel cells 12. In this particular example, fuel-bearing fluid 34 is comprised of methanol and water being delivered directly from a methanol tank 35, and a water tank 37, or a recirculating channel 53. A mixing chamber 36 is formed in base portion 14 in micro-fluidic communication with fluid supply channel 32 as illustrated. In a preferred embodiment, fuel-bearing fluid 34 is preferably 0.5%–4.0% methanol in water (99.5%–96.0%) The goal is to pump methanol into the overall assembly 10 at a rate of approximately 0.002 ml/min and pump the water into the assembly 10 at a rate of approximately 0.098 ml/min (2% to 98%). The fuel cell assembly 10 would also be able to use other fuels, such as hydrogen or ethanol, but it should be noted that ethanol is not as efficient, nor does it produce as much power as does the use of methanol. In this particular example a separate methanol tank 35 and water tank 37 are utilized to supply the fuel-bearing fluid 34. The methanol and the water will be regulated by a methanol concentration sensor 39 and added as needed. In sensing the concentration of methanol in the fuel supply, methanol concentration sensor 39 is in communication with inlets 30 and 31 through a feedback loop 40. Methanol concentration sensor 39 helps maintain the methanol ratio in the mixture. The methanol and water will be homogeneously mixed in mixing chamber 36 before flowing to each individual fuel cell 12. It should be understood that fluid supply channel 32 provides for an equal and simultaneous delivery of fuel-bearing fluid 34 to each individually formed fuel cell 12.

In addition, there is formed in base portion 14, an exhaust channel 38 communicating with each of the at least two spaced apart fuel cells 12. Exhaust channel 38 serves to remove exhaust products 42 from fuel cells 12, namely carbon dioxide and a water/methanol mixture. During operation, exhaust products are separated in a carbon dioxide separation chamber 44 into the water/methanol mixture 46 and a carbon dioxide gas 48. Next, gas 48 is expelled through an exhaust outlet 52, such as a gas permeable membrane and water/methanol mixture 46 is recirculated through a recirculating channel 53, having included as a part thereof a pump 54, such as a MEMS pump, or check valve type assembly, back to mixing chamber 36.

Recirculation of the water/methanol mixture, subsequent to reaction in the fuel cell, and the recycling of the water diffused across the cathode, is required for miniaturizing the system. It is anticipated that the fuel delivery system includes methanol and water, in the form of methanol tank 35 and water tank 37, which is to be carried in portable disposable cartridge-like devices, connected through tubing to the base portion 14.

Fuel cell device 10 typically has formed as a part thereof, four individual fuel cells 12, having an overall base portion 14 dimension of approximately 5.5 cm×5.5 cm×0.5 cm, and individual fuel cell 12 area of 4×1.5–2.0 cm squares. Each individual fuel cell 12 is capable of generating approximately 0.5 V and 22.5 mA/cm$^3$ of power.

Figure 2:
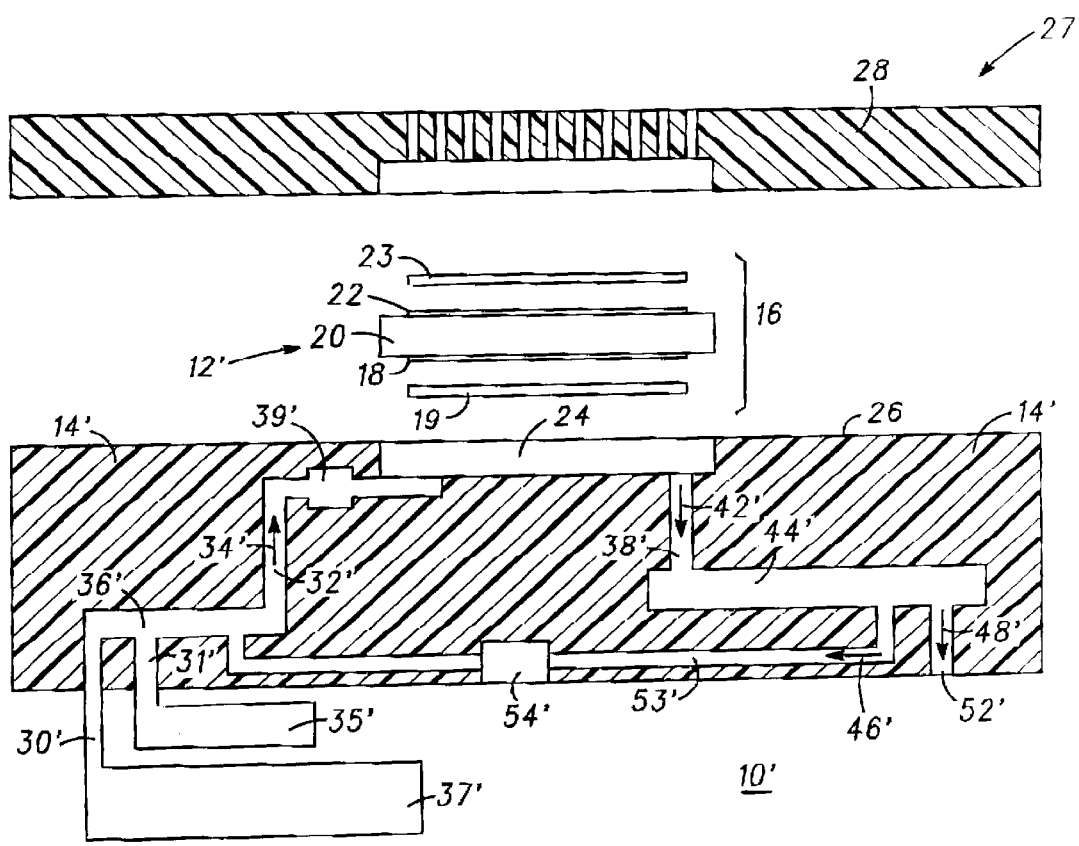
FIG. 2 is a simplified sectional view of an alternate embodiment of a direct methanol fuel cell system including an integrated sensor formed, according to the present invention.

Referring now to FIG. 2, illustrated is a fuel cell system, generally referenced 10' including a single fuel cell assembly 12'. It should be noted that all components of the first embodiment as illustrated in FIG. 1, that are similar to components of this particular embodiment as illustrated in FIG. 2, are designated with similar numbers, having a prime added to indicate the different embodiment. Fuel cell 12' is comprised of a fuel cell membrane electrode assembly 16 comprising a first electrode 18, including a carbon cloth backing 19, a film 20, such as a protonically conducting electrolyte membrane, and a second electrode 22, including a carbon cloth backing 23. First and second electrodes 18 and 22 are comprised of any metal, including those selected from the group consisting of platinum, palladium, gold, nickel, tungsten, ruthenium, molybdenum, osmium, iridium, copper, cobalt, iron, and alloys of platinum, palladium, gold, nickel, tungsten, molybdenum, osmium, iridium, copper, cobalt, iron, and ruthenium. Other components that may be contained in electrodes 18 and 22 are protonically conductive polymer, electrically conductive polymer, and inorganic supports such as carbon and metal oxides. Film 20 is further described as formed of a Nafion® type material that prevents the permeation of fuel from the anode side (first electrode 18) to the cathode side (second electrode 22) of fuel cell 12'.

Membrane electrode assembly 16 in this particular example is positioned in a recess 24 formed in an uppermost major surface 26 of base portion 14'. It is anticipated by this disclosure that membrane electrode assembly 16 can be positioned on major surface 26 of base portion 14' without the need for the formation of recess 24. In this instance, a spacer (not shown) would be utilized to avoid complete compression of membrane electrode assembly 16.

Planar stack 10' further includes a top portion, more specifically, in this particular embodiment, a current collector 28 positioned to overlay membrane electrode assembly 16. Current collector 28 is formed as part of a cap portion, generally referenced 27. Cap portion 27 provides for the exposure of second electrode 22 to ambient air.

During fabrication, individual fuel cell membrane electrode assemblies 16 are formed using a hot press method, or any other methods well known in the art. More particularly, the plurality of first electrodes 18 are formed or positioned in contact with major surface 26 of base portion 14'. Various materials are suitable for the formation of electrodes 18 as previously described.

In this specific embodiment, and for exemplary purposes, each of the plurality of first electrodes 18 has a dimension of approximately 2.0 cm×2.0 cm. When planar stack 10' includes a plurality of fuel cells 12', such as that discussed previously with respect to FIG. 1, there is included a separation of approximately 0.5 mm to 1 mm between adjacent fuel cells 12.

Film 20, formed of a protonically conducting electrolyte, also referred to as a proton exchange membrane (PEM), typically is comprised of a Nafion® type material. Film 20 as previously stated serves to limit the permeation of fuel from the anode 18 of fuel cell 12 to the cathode 22 of fuel cell 12.

Next, during fabrication of membrane electrode assembly 16, a plurality of second electrodes 22 are formed to be correspondingly cooperating with the plurality of first electrodes 18. Each second electrode 22 is formed having approximately the same dimension as its corresponding first electrode 18. It should be understood, that as described, fuel cell membrane electrode assemblies 16 are each comprised of first electrode 18, film 20 and second electrode 22.

Finally, current collector 28 is positioned relative to second electrode 22. Current collector 28 is formed at least 0.1 mm thick and of a length dependent upon a point of contact on fuel cell 12'. In the alternative, when the device includes a plurality of fuel cells 12', the plurality of fuel cells 12' can be electrically interfaced using silver conducting paint deposited by evaporation or sputtering. Materials suitable for this are gold (Au), silver (Au), copper (Cu), or any other low electrical resistant material. The bulk resistivity of the electrode material and area of the electrode will dictate the type of current collection scheme to minimize ohmic losses. In addition, anticipated by this disclosure to achieve electrical interface between the plurality of direct methanol fuel cells 12', are patterned conductive epoxy and pressing, wire bonding, tab bonding, spring contacts, flex tape, or alligator clips. It should be understood, that it is anticipated that fuel cells 12' can be electrically interfaced utilizing either a series connection or a parallel connection, dependent upon the desired resultant voltage. To achieve electrical interfacing (not shown) of the plurality of fuel cells 12', each of the second electrodes 22 is electrically connected to an adjacent first electrode 18, thus connected in series electrical interface, to increase the output voltage of the fuel cell array apparatus 10' or each of the first electrodes 18 is electrically connected to an adjacent first electrode 18, and each of the second electrodes 22 is electrically connected to an adjacent second electrode 22, thus connected in parallel electrical interface, to increase the output voltage of the fuel cell array apparatus 10'.

Referring now to FIG. 3, illustrated is a simplified schematic diagram detailing a fuel delivery system 60 according to the present invention. Illustrated are methanol tank 35 and water tank 37 in microfluidic communication with mixing chamber 36. In combination, tanks 35 and 37 and mixing chamber 36 form the fuel delivery 62 portion of system 60. Mixing chamber 36 as previously discussed serves to supply the proper ratio of methanol to water. Once properly mixed, the fuel-bearing fluid flows through the fluid supply channel toward the fuel cell 12. An optional MEMs-type pump 40 is utilized to assist with this flow. Concentration sensors 39 are provided to assist with monitoring the methanol concentration, and the temperature of the fuel-bearing fluid. In addition, provided are temperature sensors and flow sensors. During operation spent fluid is exhausted through the exhaust channel toward a carbon dioxide separation chamber and carbon dioxide vent, generally referenced 44. In addition, water may be recovered from the cathode side of the fuel cell 12, and from the separation chamber 44 and is recirculated through recirculating channel 53 back to the mixing chamber 36. This recirculating of fluid provides for the consumption of less water from water tank 37 and thus less replenishment of water tank 37. In combination, these components as described make up the microfluidics portion 64 of system 60.

As described, once the fuel-bearing fluid reaches fuel cell stack 12, power is generated. The generated power is supplied to a DC—DC converter 68 which converts the generated voltage to a useable voltage for powering a portable electronic device, such as a cell phone 70 and included as a part thereof a rechargeable battery 72 and control circuitry 74. These components in combination comprise the electronics portion 66 of system 60.

Referring now to FIGS. 4–6, illustrate in simplified sectional view are various types of methanol concentration sensors 80, 80' and 80", which serve as methanol sensor 39 and 39' of FIGS. 1 and 2, respectively, of the present invention. As previously described, in this particular invention, sensor 39 measures the current or voltage signal created by the electrochemical reactions. The current or voltage signal is proportional to the concentration of the methanol in the deionized water. Throughout FIGS. 4, 5, and 6, each sensor 80, 80' and 80" includes a gold current collector layer 88 that is applied on substrate 14 and a cover 92. A membrane electrode assembly 82 is provided due to its proton conduction capabilities and includes a plurality of electrodes 84 and 85 and film layer 87. Electrodes 84 and 85 are formed of platinum, for hydrogen evolution, and platinum/ruthenium for methanol electro-oxidation, with or without protonically conductive polymer and inorganic support. At higher potentials (above 0.8 V), platinum was used for the methanol electro-oxidation.

Referring more specifically, to FIG. 4, illustrated is methanol sensor 80, which is formed as a potentiometric sensor. As illustrated, a methanol in water solution 86 enters sensor 80 through a bottom ceramic substrate, or current collector, 88. Solution 86 contacts a platinum/ruthenium electrode 84 of assembly 82 where the methanol is oxidized. The products are then carried through a flow system (as illustrated by the arrows) onto the platinum electrode 85 where the hydrogen is reduced according to the chemical equation 90. The flow of electrons is measured as current which is proportional to the concentration of methanol. Sensor 80 is diffusion limited by the amount of methanol that is oxidized at electrode 84. Using this sensor design for sensor 39 of FIGS. 1–2, a non-linear relationship between current and concentration is found.

Referring now to FIG. 5, an alternative embodiment for sensor 39, referenced sensor 80' is illustrated. It should be noted that all components of the first embodiment as illustrated in FIG. 4, that are similar to components of the additional embodiments as illustrated in FIGS. 5 and 6, are designated with similar numbers, having a prime and a double prime added, respectively, to indicate the different embodiments. Sensor 80' is a driven mode methanol sensor, more particularly, sensor 80' is formed as an amperometric sensor. A voltage above 0.8 V is applied to drive the sensor. Similar to the first embodiment, a methanol in water solution 86' enters sensor 80' through an aperture formed on a ceramic substrate 88'. This solution then contacts a platinum electrode 84' of membrane electrode assembly 82'. The methanol then crosses through a film 87' onto the opposite platinum electrode 85' where the methanol is oxidized. A seal against air is provided by a closed lid ceramic substrate 92'. The products diffuse back through membrane electrode assembly 82' where the hydrogen is oxidized on platinum electrode 84'. The flow of electrons is measured as current which is proportional to the concentration of methanol. Sensor 80' is diffusion limited by the saturation amount of methanol that crosses over membrane assembly 82'. In order for sensor 80' to be fully driven, a saturation voltage must be used to drive sensor 80'. This saturation voltage is based on the thickness of film 87', and the size of the aperture formed on the ceramic substrate 88' in assembly 82'. Using this sensor design, a linear relationship between current and concentration is found.

Referring now to FIG. 6, illustrated is an additional embodiment for sensor 39 of the present invention. As illustrated in FIG. 6, illustrated is a sensor 80" that is formed as a passive mode methanol sensor. More particularly, sensor 80" is formed as a potentiometric sensor wherein no voltage is needed to drive sensor 80" and the sensor generates a voltage signal and hence is said to run in a passive mode. As in the previous embodiments, a methanol in water solution 86" enters sensor 80" through a ceramic substrate 88". Solution 86" then contacts a platinum/ruthenium electrode 84' where the methanol is oxidized. The hydrogen ions diffuse through a film 87" where it is reduced by the contact with oxygen in air. The potential difference is measured as a voltage that is proportional to the concentration of methanol. Sensor 80" is limited by the amount of air, entering through Cover 92", that contacts the membrane electrode assembly 82" and is therefore the factor that drives the flow of electrons. Sensor 80" acts as a direct methanol fuel cell except that the flow of air to the cathode, or electrode 85", is limited by the aperture size of the air breathing layer of ceramic substrate.

Accordingly, disclosed is a direct methanol fuel cell system and method of fabrication which provides for the inclusion of a single fuel cell or a plurality of fuel cells to be formed on a planar surface, and having integrated a methanol concentration sensor for the regulation of methanol concentration in the fuel supply. More particularly, the design provides for the inclusion of an integrated sensor. In addition, it is disclosed that the system of the present invention is a semi-self contained system, and is not orientation sensitive, thus providing for ease in moving the system, such as when providing power to a portable electronic device.

While we have shown and described specific embodiments of the present invention, further modifications and improvements will occur to those skilled in the art. We desire it to be understood, therefore, that this invention is not limited to the particular forms shown and we intend in the appended claims to cover all modifications that do not depart from the spirit and scope of this invention.

What is claimed is:

1. A fuel cell system comprising:

a base portion, formed of a singular body, and having a major surface;

at least one fuel cell membrane electrode assembly formed on the major surface of the base portion;

a fluid supply channel defined in the base portion and communicating with the at least one fuel cell membrane electrode assembly, the fluid supply channel including a mixing chamber and at least two fuel-bearing fluid inlets;

a methanol concentration sensor defined in the base portion and positioned to communicate with the fluid supply channel and the at least one fuel cell membrane electrode assembly, whereby the mothanol concentration sensor includes a membrane and provides for one of a measurement of a flow of electrons across the membrane as a current, in response to an input voltage, or a measurement of the potential difference across the membrane as a voltage, the measurement is proportional to a concentration of methanol in a fuel supply supplied by the fluid supply channel, thereby providing for the monitoring of the fuel supply to the membrane electrode assembly;

an exhaust channel defined in the base portion and communicating with the at least one fuel cell membrane electrode assembly, the exhaust channel including a water recovery and recirculation system, the exhaust channel spaced apart from the fluid supply channel for exhausting fluid from the at least one fuel cell membrane electrode assembly, the at least one fuel cell membrane electrode assembly and the cooperating fluid supply channel and cooperating exhaust channel forming a single fuel cell assembly; and a plurality of electrical components formed in the base portion for electrical integration of the fuel cell assembly.

2. A fuel cell system as claimed in claim 1 wherein the base portion comprises a material selected from the group consisting of ceramic, plastic, glass, graphite, and silicon.

3. A fuel cell system as claimed in claim 2 further wherein the at least one fuel cell membrane electrode assembly formed on the major surface of the base portion includes a plurality of fuel cell membrane electrode assemblies formed on the major surface of the base portion.

4. A fuel cell system as claimed in claim 2 wherein the fuel cell membrane electrode assembly includes a first electrode, a film adjacent the first electrode, formed of a protonically conductive electrolyte, and a second electrode in contact with the film.

5. A fuel cell system as claimed in claim 4 wherein the first and second electrodes comprise a material selected from the group consisting of platinum, palladium, gold, nickel, tungsten, ruthenium, molybdenum, and alloys of platinum, palladium, gold, nickel, tungsten, molybdenum, osmium, iridium, cobalt, copper, iron, and ruthenium.

6. A fuel cell system as claimed in claim 5 wherein the first and second electrodes further comprise one of a proton conductive polymer or an electrically conductive polymer.

7. A fuel cell system as claimed in claim 5 wherein the film overlying the first electrode comprises a proton exchange material.

8. A fuel cell system as claimed in claim 7 wherein the fuel-bearing fluid is comprised of mixture of methanol and water, supplied by a separate methanol source and a separate water source, and mixed in-situ.

9. A fuel cell system as claimed in claim 8 wherein the methanol concentration sensor, includes an anode and a cathode, the methanol concentration sensor positioned to communicate with the fluid supply channel to supply fluid to the anode and in communication with the fuel cell membrane electrode assembly.

10. A fuel cell system as claimed in claim 9 wherein the methanol concentration sensor includes a feedback loop for the transmission of electrical signals to the two fuel-bearing fluid inlets.

11. A fuel cell system as claimed in claim 10 wherein the methanol concentration sensor includes a closed cap characterized as insulating the cathode from ambient air.

12. A fuel cell system as claimed in claim 10 wherein the methanol concentration sensor includes an closed cap characterized as insulating the cathode from the fluid supply.

13. A fuel cell array apparatus comprising:
  a base portion, formed of a singular body, and having a major surface, the base portion formed of a material selected from the group consisting at ceramic, plastic, glass, and silicon;
  at least one fuel cell membrane electrode assembly formed on the major surface of the base portion, the at least one fuel cell membrane electrode assembly including a first electrode, a film in contact with the first electrode and formed of a protonically conductive electrolyte, and a second electrode in contact with the film;
  a fluid supply channel defined in the base portion and communicating with the at least one fuel cell membrane electrode assembly for supplying a fuel-bearing fluid to the at least one fuel cell membrane electrode assembly, the fluid supply channel further including a first fuel-bearing fluid inlet, and a second fuel-bearing fluid inlet, and a mixing chamber:
  an integrated methanol concentration sensor including an anode and a cathode, positioned to communicate with the fluid supply channel to supply fluid to the anode and in communication with the at least one fuel cell membrane electrode assembly, whereby the methanol concentration sensor includes a membrane and provides for one of a measurement of a flow of electrons across the membrane as a current, in response to an input voltage, or a measurement of potential difference across the membrane as a voltage, the measurement is proportional to a concentration of methanol in a fuel supply supplied by the fluid supply channel, thereby providing for the regulating of a fuel supply to the membrane electrode assembly;
  an exhaust channel defined in the base portion and communicating with the at least one fuel cell membrane electrode assembly, the exhaust channel spaced apart from the fluid supply channel for exhausting fluid from the at least one spaced apart fuel cell membrane electrode assembly, the exhaust channel further including a water recovery and recirculation assembly in fluidic communication with the second electrode of the at least one fuel cell membrane electrode assembly, in combination the at least one fuel cell membrane electrode assembly and the cooperating fluid supply channel and cooperating exhaust channel forming a single fuel cell assembly; and
  a top portion including a plurality of electrical components for electrical integration of the plurality of formed fuel cell assemblies.

14. A fuel cell array apparatus as claimed in claim 13 further including a plurality of spaced apart fuel cell membrane electrode assemblies formed on the major surface of the base portion, thereby forming a plurality of fuel cell assemblies.

15. A fuel cell system as claimed in claim 13 wherein the methanol concentration sensor includes a closed cap characterized as insulating the cathode from ambient air.

16. A fuel cell system as claimed in claim 13 wherein the methanol concentration sensor includes an closed cap characterized as insulating the cathode from the fluid supply.

17. A method of fabricating a fuel cell array apparatus comprising the steps of:
  providing a base portion formed of a material selected from the group consisting of Ceramic, plastic, glass, graphite, and silicon;
  forming a fluid supply channel in the base portion for supplying a fuel-bearing fluid to at least one fuel cell membrane electrode assembly, the fluid supply channel further including a mixing chamber and a methanol concentration sensor;
  forming a methanol concentration sensor including an anode and a cathode, the sensor positioned to communicate with the fluid supply channel to supply fluid to the anode and in communication with the at least one fuel cell membrane electrode assembly, whereby the methanol concentration sensor includes a membrane and provides for one of a measurement of a flow of electrons across the membrane as a current, in response to an input voltage, or a measurement of the potential difference across the membrane, the measurement is proportional to a concentration of methanol in a fuel supply supplied by the fluid supply channel, thereby providing for the regulating of a fuel supply to the membrane electrode assembly;
  forming an exhaust channel in the base portion, the exhaust channel spaced apart from the fluid supply channel for exhausting fluid from the at least one spaced apart fuel cell membrane electrode assembly, the exhaust channel further including a water recovery and recirculation system for the recovery and recirculation of a spent fuel-bearing fluid;
  forming the at least one fuel cell membrane electrode assembly on the major surface of the base portion, the step of forming the at least one spaced apart fuel cell membrane electrode assembly including the steps of providing for a first electrode on a major surface of the base portion, providing for a film in contact with the first electrode and formed of a protonically conductive electrolyte, and providing for a second electrode in contact with the film, the at least one spaced apart fuel cell membrane electrode assembly and the cooperating fluid supply channel and cooperating exhaust channel forming a single fuel cell assembly; and
  forming a top portion including a plurality of electrical components for electrical integration of the formed fuel cell assembly.

18. A method of fabricating a fuel cell army apparatus as claimed in claim 17 wherein the step of forming the at least one fuel cell membrane electrode assembly on the major surface of the base portion includes the step of forming a plurality of fuel cell membrane electrode assemblies.

* * * * *